Aug. 1, 1967 R. E. PARK ETAL 3,334,008
GLASS LAMINATE HAVING AN UNSATURATED POLYESTER
RESIN CONTAINING SILANE ADHESIVE INTERLAYER
Filed July 17, 1963

INVENTORS
CHARLES B. SIAS and
ROBERT E. PARK
BY
Oscar L Spencer
ATTORNEY

United States Patent Office 3,334,008
Patented Aug. 1, 1967

3,334,008
GLASS LAMINATE HAVING AN UNSATURATED POLYESTER RESIN CONTAINING SILANE ADHESIVE INTERLAYER
Robert E. Park, Allison Park, and Charles B. Sias, Monroeville, Pa., assignors to Pittsburgh Plate Glass Company, Pittsburgh, Pa., a corporation of Pennsylvania
Filed July 17, 1963, Ser. No. 295,710
4 Claims. (Cl. 161—193)

This invention relates to a novel adhesive composition for glass plates, wherein the adhesive composition comprises an unsaturated polyester resin containing 3-glycidoxypropyltrimethoxysilane, 3 - (trimethoxysilyl)propyl methacrylate, or 3,4 - epoxycyclohexylethyltrimethoxysilane. More particularly, this invention relates to laminates of two solid outer layers wherein at least one of the outer layers is a layer of glass, and a resinous interlayer comprising the novel adhesive composition described above.

The adhesion of glass plates to various substrates has long been a problem. This is particularly so when it is desired to adhere a glass plate to another transparent plate, such as glass, therefore generally requiring the adhesive to possess good optical properties as well as excellent physical properties such as high tensile strength, high shear strength, and high impact resistance.

The utilization of polyester resins as an adhesive for glass plates has long been sought because of the availability of such resins and because of their excellent physical properties, including excellent optical properties. The optical properties are especially important as one of the important applications for polyesters interlayers is in television picture tube implosion shields. Polyester resins, however, have not been widely used as an adhesive for glass plates as polyester resins do not readily adhere to glass plates over broad temperature ranges. The improvement of the adhesion of unsaturated polyester resins to glass is an object of this invention.

It has been discovered that the addition of minor amounts of a silane selected from the class consisting of 3 - glycidoxypropyltrimethoxysilane, 3-(trimethoxysilyl) propyl methacrylate, and 3,4-epoxycyclohexylethyltrimethoxysilane to an unsaturated polyester resin vastly improves the adhesion of said resin to glass plates or layers of glass. As used in this specification and appended claims, the terms "plate" or "sheet" are intended to include glass of various curvatures and shapes as well as glass having a planar surface.

It is surprising that the improvement in adhesion occurs as other types of silanes, such as vinyl trichlorosilane, amino propyl triethoxysilane, vinyl triacetoxysilane, and the like which are useful in improving the adhesion of polyester resins to glass fibers do not effect a similar improvement in causing resins to adhere to glass plates. In fact, in some instances, the addition of certain silanes to a polyester resin decreased the adhesiveness of that resin to glass plates rather than effecting an improvement.

The improvement effected by the above silanes is significant in rigid unsaturated polyesters as well as flexible unsaturated polyester resins, however, the improvement is most beneficial in flexible unsaturated polyester resins which have a poorer initial adhesion to glass plates. Such flexible unsaturated polyester resins have a Barcol hardness of less than about 40.

Silane additive

The silane additive useful in improving the adhesion of unsaturated polyester resins to glass plates include 3-glycidoxypropyltrimethoxysilane, 3-(trimethoxysilyl)propyl methacrylate, and 3,4-epoxycyclohexylethyltrimethoxysilane. These additives are readily soluble in polyester resins and may be admixed in a polyester resin either before or after a polymerization catalyst is added.

The effective levels for these additives have been found to be from about 0.05 percent by weight to about 5.0 percent by weight based on the total weight of the resin, although quantities in excess of about 1.0 percent by weight are generally not required. The general improvement in adhesion is about 10 percent; that is, a polyester resin containing one of the above silane additives has about 10 percent greater adhesion to a glass plate than does the unmodified polyester resin. In many instances, this improvement is the difference between a useful product and a substantially useless product.

The magnitude of the improvement of room temperature adhesiveness of an unsaturated polyester resin to glass caused by the inclusion of one of the silanes described above is very significant; however, even more significant is the improvement in adhesiveness at low or high temperatures. For example, at temperatures as low as about −10° F. and as high as about 300° F. conventional polyester resins frequently lose their adhesion to glass. This condition is especially prevalent when the glass-polyester laminate is subjected to cycling of temperatures, such as that which occurs in the operation of a television picture tube wherein it is subjected to high temperatures during operation and to room temperatures during periods of non-operation. Such cycling between high temperatures, that is about 200° F. or higher, to lower temperatures, that is about room temperature or lower, frequently cause delamination of conventional polyester resins used as interlayers in television implosion shields.

The novel resins of this invention, however, withstand cycling between temperatures as high as about 300° F. and as low as −10° F. without loss of adhesion to glass substrates. Furthermore, it is significant that polyester resin interlayers containing vinyl trichlorosilane, vinyl triacetoxy silane, and amino propyl triethoxysilane do not withstand such cycling without suffering loss of adhesion to glass substrates.

Polyester component

Polyester resins useful in the instant invention are conventional polyester resins comprising the esterification product of a polycarboxylic acid and a polyol, wherein about 5 mol percent to about 75 mol percent of the polycarboxylic component is an alpha, beta-ethylenically unsaturated polycarboxylic acid; and a $CH_2=C<$ monomer polymerizable with the unsaturated acid. Although levels of an unsaturated polycarboxylic acid in excess of 75 mol percent are not generally used, higher levels can be used when the polyester is prepared from a flexibilizing polyol, such as polypropylene glycol and the like. The term "acid" as used in this specification and appended claims, includes the corresponding anhydrides where such anhydrides exist.

The polyesters generally utilized in preparing the polyester resins useful in this invention have an acid number of about 5 to about 45 although an acid number of about 10 to about 15 is preferred. The $CH_2=C<$ monomer is generally present in quantities of about 15 percent by weight to about 80 percent by weight of the weight polyester resin, although preferably the quantity of $CH_2=C<$ monomer present in the resin is about 20 percent by weight to about 40 percent by weight.

These polyesters may be prepared by the esterification of a mixture of polycarboxylic acids, wherein an alpha, beta-ethylenically unsaturated polycarboxylic acid comprises about 5 mol percent to about 75 mol percent of the acid mixture, with a suitable polyol. This esterification may be conducted in the presence of a suitable nonreactive solvent, for example, toluene, xylene and the like, which is later removed; or the esterification reaction may be conducted in the absence of any solvent wherein the reactants are vigorously purged with an inert gas which removes the water of condensation as well as excluding oxygen from the reaction vessel.

The esterification reaction is generally conducted at about 350° F. to about 450° F. The reaction is continued until the desired acid number is reached, which for purposes of this invention is generally an acid number of about 5 to about 45.

The proportion of reactants employed in preparing the unsaturated polyesters of this invention is not critical and the ratio of the reactants may be varied according to the conventional procedures for producing polyesters. Theoretically, one molar equivalent of polyol is utilized for each molar equivalent of acid. However, it is conventional practice to utilize from 5 percent to about 20 percent by weight excess polyol.

The above reaction occurs without the aid of a catalyst although a catalyst such as p-toluene sulfonic acid, tannic acid, pyrogallol or the like may be added if desired. However, the esterification reaction of an unsaturated acid is conventionally conducted in the presence of a suitable inhibitor which prevents gelation during reaction. If such an inhibitor is not present during the esterification reaction, then an inhibitor is added before the unsaturated polyester is thinned with a $CH_2=C<$ monomer, such as styrene, vinyl toluene, and the like. Suitable inhibitors include:

quinone
hydroquinone
phenyl hydrazine hydrochloride
catechol
p-t-butyl catechol
p-benzyl aminophenol
di-beta-naphthyl paraphenyldiamine
trimethyl benzyl ammonium acid oxalate and the like.

The polycarboxylic acid mixture, as mentioned above, generally contains about 5 mol percent to about 75 mol percent of an alpha, beta-ethylenically unsaturated polycarboxylic acid in the production of polyesters useful in this invention. Such alpha, beta-ethylenically unsaturated polycarboxylic acids include:

| | |
|---|---|
| maleic acid | citraconic acid |
| fumaric acid | itaconic acid |
| glutaconic acid | mesaconic acid | and the like, and of course, the respective anhydrides where such anhydrides exist.

The remainder of the polycarboxylic acid mixture can comprise a saturated polycarboxylic acid or an aromatic unsaturated polycarboxylic acid, or a mixture of these. The aromatic unsaturated acids do not substantially participate in cross-linking reactions with $CH_2=C<$ monomers or with alpha, beta-ethylenically unsaturated polycarboxylic acids. Such aromatic unsaturated acids include:

phthalic acid
isophthalic acid
terephthalic acid
endomethylene tetrahydrophthalic acid
hexachloroendomethylene tetrahydrophthalic acid and the like, including of course, the corresponding anhydrides where such anhydrides exist.

Saturated acids which may be used include:

| | |
|---|---|
| hexahydrophthalic acid | suberic acid |
| adipic acid | azelaic acid |
| succinic acid | sebacic acid |
| pimelic acid | malonic acid | and the like.

Polyols useful in preparing the polyesters used in this invention include:

ethylene glycol
propylene glycol
butylene glycol
glycerol
diethylene glycol
dipropylene glycol
triethylene glycol
pentaerythritol
neopentyl glycol
bis(4-hydroxyphenyl)-2,2-propane
bis(4-hydroxycyclohexyl)-2,2-propane and the like.

Unsaturated polyols may also be utilized in the preparation of the above-described polyesters. Such unsaturated polyols are generally used in minor quantities and include butenediol, 2,5-dimethyl-3-hexyne-2,5-diol, and the like.

The unsaturated polyesters prepared in the manner described above have a medium to high molecular weight and are generally thinned with a $CH_2=C<$ monomer to achieve a suitable viscosity. The $CH_2=C<$ monomer also serves as a cross-linking agent which facilitates curing of the unsaturated polyester resin. The conventional cross-linking monomers include:

| | |
|---|---|
| styrene | diallyl phthalate |
| vinyl toluene | triallyl cyanurate |
| alpha-methyl styrene | methyl methacrylate |
| divinyl benzene | allyl carbonate |
| dichlorostyrene | methallyl maleate | and the like.

In applications where a low temperature-curing unsaturated polyester is required, then the preferred cross-linking monomers are styrene and methyl methacrylate, or mixtures thereof.

As mentioned above, the $CH_2=C<$ monomer is utilized in quantities of about 15 percent by weight to about 80 percent by weight of the weight of the polyester resin. Also, when the polyester is thinned with a $CH_2=C<$ monomer, an inhibitor, such as the ones listed above, should be present to preclude gelation during storage of the resin.

A more comprehensive description of polyester preparation, raw materials, catalysts, inhibitors and the like, can be found in Polyesters and Their Applications by Johan Bjorksten, Reinhold Publishing Co. (1956), pages 21–97, and in Polyester Resins by John R. Lawrence, Reinhold Publishing Co. (1960), pages 13–106.

LAMINATING PROCEDURE

Unsaturated polyester resins of the type described above which contain 3-glycidoxypropyltrimethoxysilane, 3-(trimethoxysilyl)propyl methacrylate, or 3,4-epoxycyclohexylethyltrimethoxysilane are useful as adhesives for bonding glass plates to various other strata. To accomplish such bonding, it is necessary to properly apply and cure the resin.

The resin to be properly applied should contain a suitable polymerization catalyst, and preferably a suitable accelerator. Suitable polymerization catalysts are generally added in quantities of about 0.05 percent to about 4 percent by weight of the total polyester resin and include:

benzoyl peroxide
methyl ethyl ketone peroxide
cumene hydroperoxide
lauroyl peroxide
tertiary butyl hydroperoxide
p-chlorobenzoyl peroxide
succinic acid peroxide
hydroxyheptyl peroxide
di-t-butyl diperphthalate and the like.

Suitable accelerators for such catalysts are generally added in quantities of about 0.01 percent to about 0.5 percent by weight of the total polyester resin and include:

cobalt naphthenate
manganese naphthenate
diethyl aniline
dimethyl aniline
docey1 mercaptan mercapto ethanol
triethanolamine
diethylenetriamine
butyraldehyde aniline
piperidine and the like.

The unsaturated polyester resins which have been thinned and properly catalyzed are generally applied as a bonding agent or adhesive by forming a chamber or cell of the sheets or plates to be bonded together. It is generally necessary to form such a cell as the resins are too fluid to be self-supporting for an adequate period to permit curing. However, if desired, the resins can be made more viscous by the use of higher molecular weight resins and the addition of thixotropic agents. Thus, by slight modification, the novel unsaturated polyester resins of this invention can be used to bond glass plates to other objects without the necessity of forming a cell for the containment of the resin.

For most applications, however, the formation of a cell for the containment of the resin is not disadvantageous as this method facilitates the preparation of laminates wherein the thickness of the resinous interlayer can be accurately controlled. As mentioned above, the polyester resins of this invention are particularly useful inasmuch as they possess flexibility and adhesiveness to glass plates; therefore, these resins are especially useful in the preparation of safety glass laminates which are conveniently produced by formation of a cell comprising the glass plates to be bonded together. Thus, a certain thickness of resinous interlayer may be desired to best utilize the advantageous properties of the interlayer; therefore, the formation of a cell best accomplishes this purpose.

The preparation of a glass laminate, particularly a safety glass laminate, is carried out simply by either pouring the uncured polyester resin containing 3-glycidoxypropyltrimethoxysilane, 3-(trimethoxysilyl)propyl methacrylate, or 3,4-epoxycyclohexylethyltrimethoxysilane, or mixtures thereof, between two spaced glass plates, or upon plates which are to be bonded and placing them together. Spacers are usually employed around the perimeter to insure uniform thickness of the interlayer. In order to obtain optimum results, the uncatalyzed polyester resin and glass assembly is subjected to a temperature ranging from about 60° F. to about 450° F. for a period of one-half hour to about 24 hours, the time required for curing being inversely proportional to the curing temperature although slight over-curing is not generally detrimental or objectionable.

If the glass-resin laminate comprises one surface of an evacuated glass tube, such as a television picture tube, then it is preferable to maintain the curing temperature below about 160° F. and preferably between about 60° F. and about 140° F. for a period of about one-half hour to about 24 hours wherein the curing period varies substantially inversely with the curing temperature. The preferred resins for such low temperature curing are those unsaturated polyesters of the type described above which are thinned with styrene, methyl methacrylate or mixtures thereof. At temperatures of about 140° F. or below, it is generally preferred that the thinning monomer be styrene, or mixtures of styrene and methyl methacrylate wherein styrene is the predominant monomer.

Various mechanical devices may be employed in admitting the resinous material into the empty space, or spaces, between plural pieces of glass. One particular advantageous method is to seal the periphery of two substantially parallel sheets of glass with a pressure-sensitive tape and force the resinous material with the aid of pressure into the space between the sheets of glass. The resinous material is conveniently forced through a self-closing valve which is held in place with the tape while the trapped air is discharged through an aperture in the taped seam at the top of the cell. The tape may or may not be left on during and after curing.

Another method of admitting the resin into the cell comprises heating the resin, preferably to about 150° F., which substantially reduces the viscosity of the resin, and pouring the resin into the cell in a manner so as not to entrap air. The laminate may then be cured by permitting the cell to stand at room temperature for about 2 hours to about 24 hours, or by heating up to a temperature of about 450° F. in a manner similar to laminates formed by the method described above wherein the resin is not pretreated.

The embodiments of the instant invention are further described in connection with the accompanying drawings.

Figure 1:
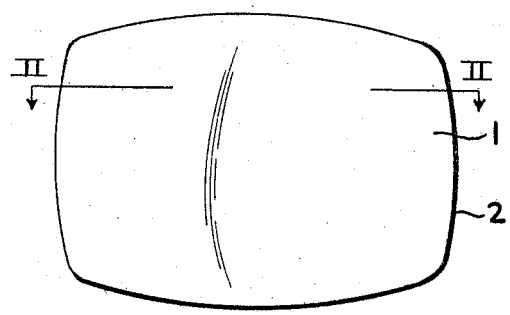
FIGURE 1 is an elevation of a standard television tube implosion shield.

The television tube of FIGURE 1 is represented generally by numeral 1. The laminate 2, represented by FIGURE 2, is the section defined by II—II of FIGURE 1 and is comprised of resinous unsaturated polyester interlayer 3 sandwiched between glass sheets 4 and 5, wherein sheet 4 is the face of a television picture tube and sheet 5 is a heavier glass sheet designed to protect the picture tube, and frequently termed an implosion shield.

Figure 3:
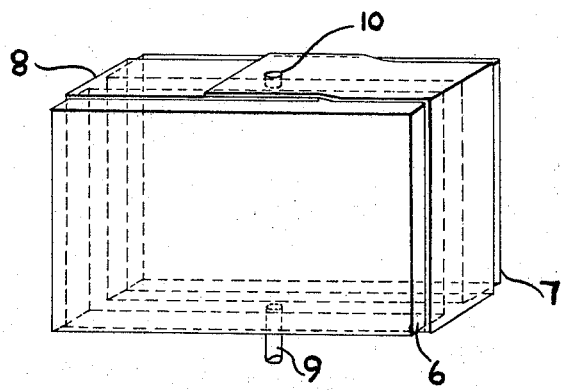
FIGURE 3 is an isometric view illustrating two parallel sheets of glass which have been taped around their periphery in order to provide a chamber or cell for the purpose of admitting the uncured resinous composition which cures to form an interlayer.

FIGURE 3 is comprised of sheets of glass 6 and 7 bound in such relationship by tape 8 wherein inlet 9 is provided for entry under pressure of above-mentioned polyester interlayer material and air outlet 10 which is provided to permit discharge of air as the resinous interlayer material fills the cells formed by glass sheets 6 and 7 and tape 8. At the inner end of the inlet 9, it is expedient to employ a self-closing valve (not shown) in order to prevent the back flow of said resinous interlayer material.

Figure 2:
FIGURE 2 is a cross-sectional view II—II of FIGURE 1 representing the glass-unsaturated polyester laminates of the instant invention.

From the drawings represented by FIGURES 1, 2, and 3, it is evident that numerous types of laminates can be prepared by utilizing the novel unsaturated polyester resin of this invention. For example, other safety glass laminates which can be prepared include automotive safety glass windshields and the like, and safety glass windows for aircraft.

Other types of laminates can also be prepared by the method described above, as for example, laminates can be made wherein the glass sheets forming the chamber or cell are in a non-parallel position.

The following examples illustrate in detail the preparation of the novel polyester compositions described hereinabove. The examples are not intended to limit the invention, for there are, of course, numerous possible variations and modifications.

*Example I*

An unsaturated polyester resin was prepared from the following ingredients:

| | Lb. moles |
|---|---|
| Adipic acid | 6 |
| Maleic anhydride | 1 |
| Diethylene glycol | 7.4 |

These ingredients were admixed with 0.25 percent by weight of triphenyl phosphite in a reaction vessel equipped with a temperature measuring device, a reflux column, a condenser, an inert gas inlet and agitator. The reaction mixture was agitated and heated to a temperature of about 400° F.

During the reaction period an inert gas flow of about 6 to 8 cubic feet per minute was maintained. The inert gas was introduced near the bottom of the kettle and permitted to bubble up through the reaction mixture.

The reaction was discontinued when an acid number of about 10 to about 15 was achieved. The reaction mixture was then permitted to cool to about 200° F., or lower, before it was thinned with styrene.

About 600 pounds of styrene was used to thin the polyester, obtaining a resin composed of about 75 percent by weight of unsaturated polyester and about 25 percent by weight of styrene and having a viscosity of about 1000 centipoise.

*Example II*

The comparative adhesive values of an unmodified polyester resin and of the same polyester resin modified with various silanes were determined in the following manner.

A polyester resin of the type prepared in Example I was catalyzed with 1 percent by weight of methy ethyl ketone peroxide. The catalyzed resin was divided in 10 equal portions. To each of 10 of such portions was added 1 percent by weight of a particular silane.

Each of the 10 portions was heated to about 150° F. and poured into a cell formed of 6 inch by 6 inch glass plates being gasketed with one-fourth inch thick gasketing material about the edges to form a chamber approximately 3 inches by 3 inches by one-fourth inch. C-clamps were placed about the plates to hold the gasketing material firmly in place.

Each of the cells was cured in a similar manner by permitting it to stand at room temperature for about 24 hours. At the end of the curing, the clamps and gasketing material were carefully removed. The laminates were tested for adhesive strength by placing them in the jaws of a tensile testing machine and pulling them apart at a speed of 0.05 inch per minute.

The jaws of the machine are designed to grip the lower and upper plates of the laminate, the laminate being in a horizontal position, and to exert a pull which is directly away from the plates, i.e., at right angles to the plates, thus precluding the separation of the laminate by a peeling action.

The following results were obtained:

| Resin | Additive | Adhesion, p.s.i.g. |
|---|---|---|
| A | Amino propyl triethoxysilane | 77.8 |
| B | 3-(trimethoxysilyl)propyl methacrylate | 91.2 |
| C | Vinyl tris(2-methoxyethoxy)silane | 64.2 |
| D | Acrylate modified trimethoxysilane | 82.0 |
| E | 3,4-epoxycyclohexylethyltrimethoxysilane | 96.7 |
| F | 3-glycidoxypropyltrimethoxysilane | 114.7 |
| G | Vinyl trimethoxysilane | 76.7 |
| H | Vinyl triacetoxisilane | 82.2 |
| I | Gamma-aminopropyltriethoxysilane | 79.8 |
| Control | | 84.1 |

It is significant that the resins (Resins B, E, and F) containing 3-(trimethoxysilyl)propyl methacrylate, 3-glycidoxypropyltrimethoxysilane, and 3,4 - epoxycyclohexylethyltrimethoxysilane showed major improvements in adhesion in comparison with the unmodified resin (control) and with the resins modified with various other silanes. Resin B had an adhesive value which was about 8 percent better than the control while Resin F had an adhesive value which was about 35 percent better than the control and Resin E had about 15 percent better adhesion.

It is noteworthy that Resins B, E, and F showed significant improvements in adhesion while the other modified resins showed only minor improvements in adhesion and, in fact, a great number of the modified resins exhibited less adhesion than the control.

The fact that some of the above silanes, specifically 3-(trimethoxysilyl)propyl methacrylate, 3-glycidoxypropyltrimethoxysilane, and 3,4 - epoxycyclohexylethyltrimethoxysilane effected an improvement in the adhesion of an unsaturated polyester resin to glass plates while other silanes did not effect any improvement is surprising inasmuch as all of these silanes, including 3-(trimethoxysilyl)propyl methacrylate, 3-glycidoxypropyltrimethoxysilane, and 3,4-epoxycyclohexylethyltrimethoxysilane effect comparable improvement in the adhesion of unsaturated polyester resins to glass fibers.

Similar improvements in adhesion to glass plate are effected in a polyester resin of the type prepared in Example I wherein fumaric acid is utilized in place of the maleic anhydride and the additive is selected from the class consisting of 3-(trimethoxysilyl)propyl methacrylate, 3 - glycidoxypropyltrimethoxysilane, and 3,4-epoxycyclohexylethyltrimethoxysilane.

*Example III*

The adhesion to glass plates of a polyester resin of the type prepared in Example I was tested at about 300° F. The resin was tested with and without various silane additives.

The resin was divided into six equal portions. No additive was added to one portion but to each of the remaining portions was added about 0.1 percent by weight of a particular silane.

Laminates were prepared from each portion by the method of Example II and cured in a similar manner. Each laminate was then subjected to a temperature of 310° F. for 40 hours. The following results were obtained:

| Laminate | Additive | Performance |
|---|---|---|
| 1 | None | Unsatisfactory. |
| 2 | Vinyl trichlorosilane | Do. |
| 3 | Vinyl triacetoxysilane | Do. |
| 4 | 3-(trimethoxysilyl)propyl methacrylate | Satisfactory. |
| 5 | 3-glycidoxypropyltrimethoxysilane | Do. |
| 6 | 3,4-epoxycyclohexylethyl-trimethoxysilane | Do. |

The laminates listed as unsatisfactory evidenced some deterioration and/or loss of adhesion in the resinous interlayer while the satisfactory laminates showed no deterioration or loss of adhesion in the resinous interlayer.

Another test frequently used to screen laminates involves subjecting the laminate to cycling temperatures. One such test involves cooling the laminate to a temperature of −35° F. for a period of 3 hours followed by one-half hour at 77° F. and then heating the laminate to 185° F. for 3 hours. This cycle is repeated five times.

The novel resins of this invention satisfactorily pass this cycling test.

Laminates used in commercial applications seldom encounter the severe conditions of the above tests, however, an acceptable laminate must be capable of satisfactorily passing such tests to provide a commercial article which does not fail if such extreme conditions are encountered. Further, the severe conditions imposed in the above tests provide an accelerated means of predicting the performance of a resinous interlayer over a long period, such as 5 to 10 years for a television implosion shield or an automobile safety glass. If a resinous interlayer cannot withstand severe conditions for a brief period, then it is likely that such an interlayer would fail upon subjection to milder conditions over an extremely long period.

Thus, the tests imposed upon the resins of this invention are an approved method for determining the acceptability of a resinous interlayer for applications in safety glass laminates and the like. Also, the adhesive strength as determined in Example II is a fairly accurate method of predicting the performance of a resinous interlayer.

Although specific examples of the invention have been set forth hereinabove, it is not intended that the invention be limited solely thereto, but to include all of the variations and modifications falling within the scope of the appended claims.

We claim:

1. A laminate comprising (a) a glass plate, (b) a resinous interlayer, and (c) a glass plate, wherein the resinous interlayer comprises an unsaturated polyester resin comprising (1) the reaction product of an alpha, beta-ethylenically unsaturated polycarboxylic acid and a polyol, (2) a $CH_2=C<$ monomer polymerizable with the reaction product, and (3) a silane selected from the class consisting of 3-glycidoxypropyltrimethoxysilane, 3-(trimethoxysilyl)propyl methacrylate, and 3,4-epoxycyclohexylethyltrimethoxysilane.

2. A laminate comprising two glass plates and a resinous interlayer, wherein the resinous interlayer comprises an unsaturated polyester resin comprising (1) the reaction product of a polycarboxylic acid and a polyol, wherein about 5 mol percent to about 75 mol percent of the polycarboxylic acid component is an alpha, beta-ethylenically unsaturated polycarboxylic acid, (2) a $CH_2=C<$ monomer polymerizable with the unsaturated reaction product and (3) a silane selected from the class consisting of 3-glycidoxypropyltrimethoxysilane, 3-(trimethoxysilyl)propyl methacrylate, and 3,4-epoxycyclohexylethyltrimethoxysilane.

3. A laminate comprising two glass plates and a resinous interlayer, wherein the resinous interlayer comprises an unsaturated polyester resin comprising (1) the reaction product of a polycarboxylic acid and a polyol, having an acid number of about 10 to about 15, wherein about 5 mol percent to about 75 mol percent of the polycarboxylic acid component is an alpha, beta-ethylenically unsaturated polycarboxylic acid, (2) about 20 percent by weight to about 80 percent by weight of a $CH_2=C<$ monomer polymerizable with the unsaturated reaction product, and (3) about 0.05 percent by weight to about 5.0 percent by weight of a silane selected from the class consisting of 3 - glycidoxypropyltrimethoxysilane, 3 - (trimethoxysilyl(propyl methacrylate, and 3,4-epoxycyclohexylethyltrimethoxysilane.

4. The laminate of claim 3 wherein the $CH_2=C<$ monomer of the unsaturated polyester resin is selected from the class consisting of styrene and methylmethacrylate.

References Cited

UNITED STATES PATENTS

| | | | |
|---|---|---|---|
| 2,742,378 | 4/1956 | Te Grotenhuis | 117—126 |
| 2,937,230 | 5/1960 | Rogers | 260—827 |
| 2,946,701 | 7/1960 | Plueddemann | 117—124 |
| 3,075,870 | 1/1963 | Hedler et al. | 156—295 |

A. WYMAN, *Primary Examiner.*

MORRIS SUSSMAN, *Examiner.*

W. J. VAN BALEN, *Assistant Examiner.*